Jan. 22, 1963 S. J. WOOLLEY 3,074,294
VARIABLE SPEED TRANSMISSION
Filed Oct. 12, 1959 3 Sheets-Sheet 3

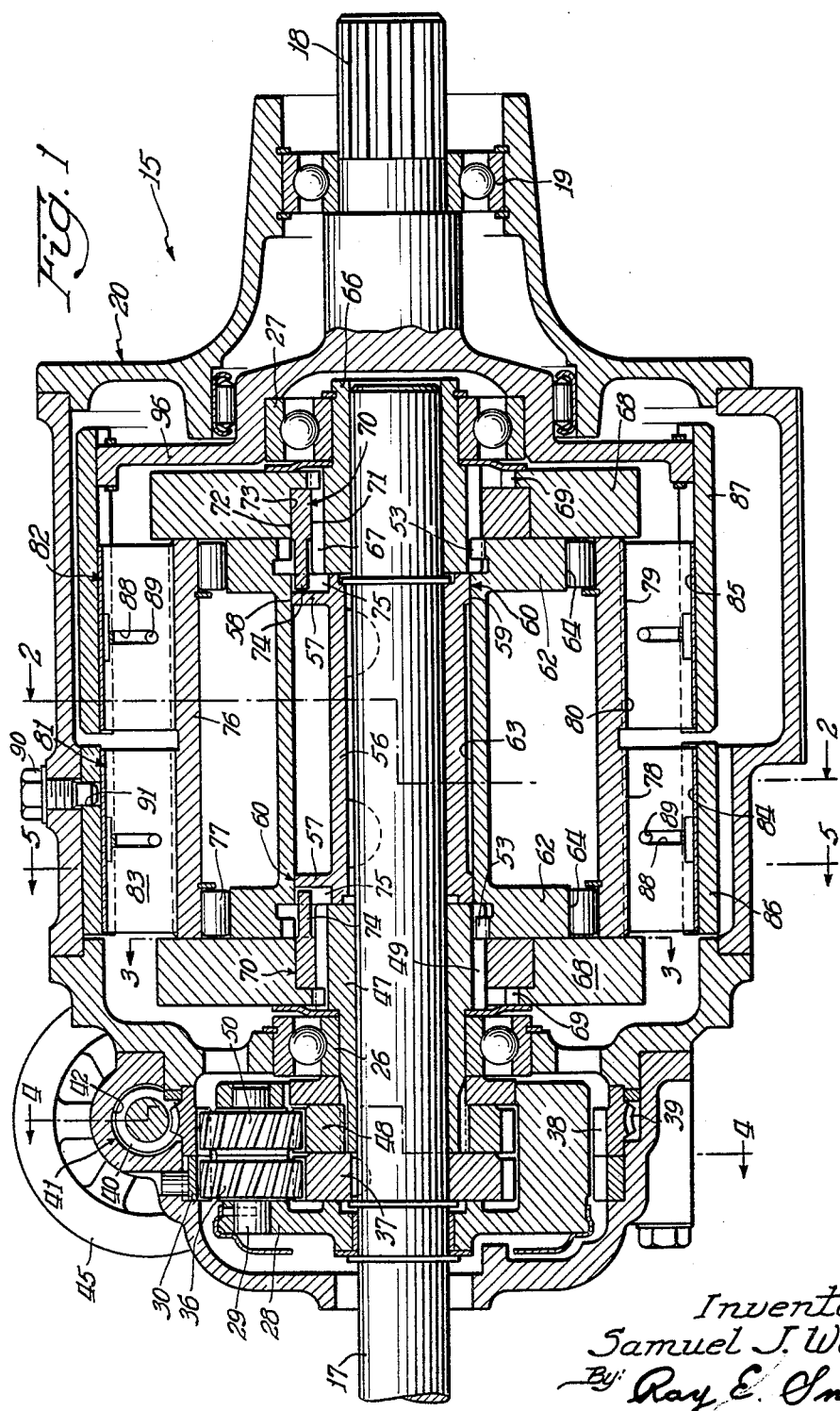

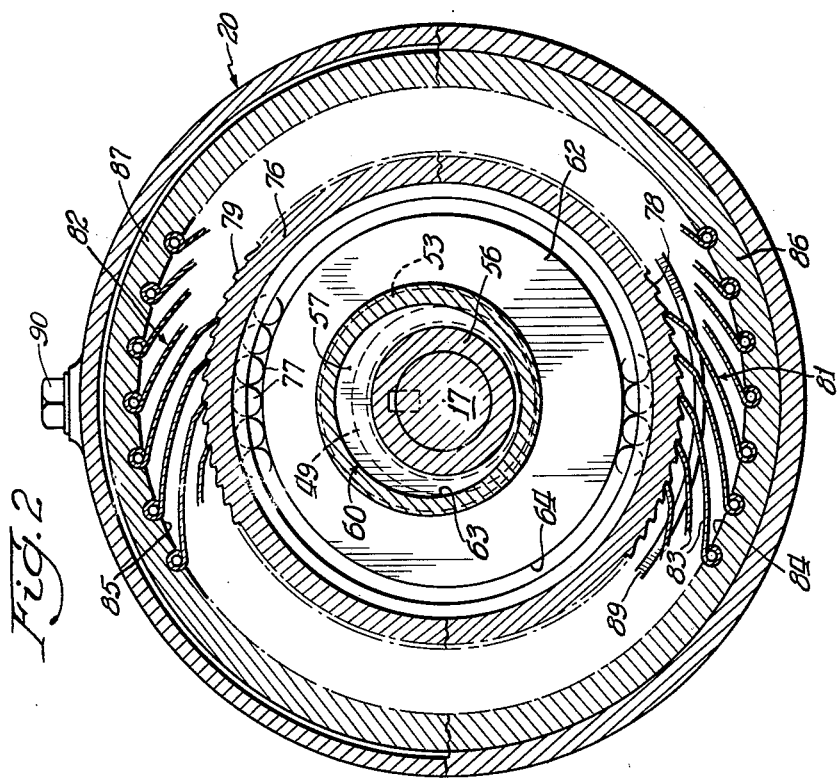
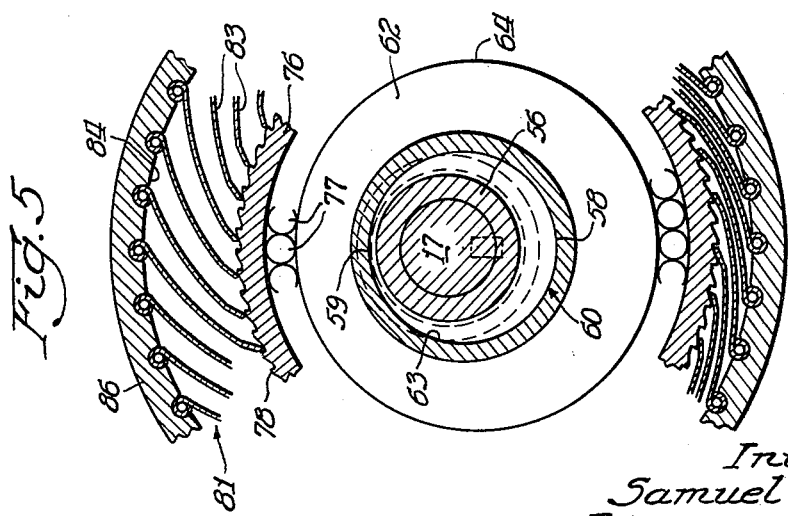

Inventor:
Samuel J. Woolley
By: Ray E. Snyder
Atty.

United States Patent Office 3,074,294
Patented Jan. 22, 1963

3,074,294
VARIABLE SPEED TRANSMISSION
Samuel J. Woolley, Wyoming, Ohio, assignor to Borg-Warner Corporation, Chicago, Ill., a corporation of Illinois
Filed Oct. 12, 1959, Ser. No. 845,689
3 Claims. (Cl. 74—675)

This invention relates to a variable speed transmission and more particularly, to a transmission mechanism for varying the speed and torque transmitted between two shafts to any value less than a given maximum.

In the transmission of power between a drive shaft and a driven shaft it is often necessary to provide a change in torque and speed between the shafts during rotation of the drive shaft. In the past this was done by various arrangements of gears providing several gear ratios, and clutches facilitating disconnection of the drive shaft to allow selection of predetermined ratios provided by certain groups of gears. A transmission of this sort provides predetermined fixed values of torque and speed between the drive and the driven shafts and requires a structure for disconnecting the drive shaft to facilitate changing from one gear ratio to another.

In some instances where a variable transmission is needed it would be highly desirable to provide a transmission having an infinite number of torque and speed changes between zero and a given maximum value which can be automatically changed without disconnecting the drive shaft of the transmission. A transmission having an integrated speed and torque changing characteristic, independent of the drive shaft condition, which could be set at any predetermined value would provide the necessary infinite number of changes without interruption.

It is the primary object of this invention to provide an uncomplicated transmission of economical construction for providing infinitely and uniformly variable torque and speed ratios between zero and a predetermined maximum.

Another object of this invention resides in an eccentric which has an adjustable eccentricity for directly determining a given torque and speed ratio.

A further object of this invention is to provide an eccentric adjusting mechanism for automatically or manually adjusting radial displacement of a speed and torque modifying eccentric, mounted on a drive shaft, when the drive shaft is being rotated.

The invention consists of the novel constructions, arrangements and devices to be hereinafter described and claimed for carrying out the above stated objects, and such other objects as will appear in the following description of a preferred embodiment of the invention, illustrated with reference to the accompanying drawings in which:

FIG. 1 is a sectional view taken vertically through the drive and driven axes of the transmission showing all adjustable elements in neutral position.

FIG. 2 is a sectional view taken along line 2—2 of FIG. 1 showing the position of the oppositely disposed springs and respective reaction bands.

FIG. 5 is a sectional view along line 5—5 of FIG. 1 showing the position of the springs resulting from eccentricity of the eccentric.

Figure 4:
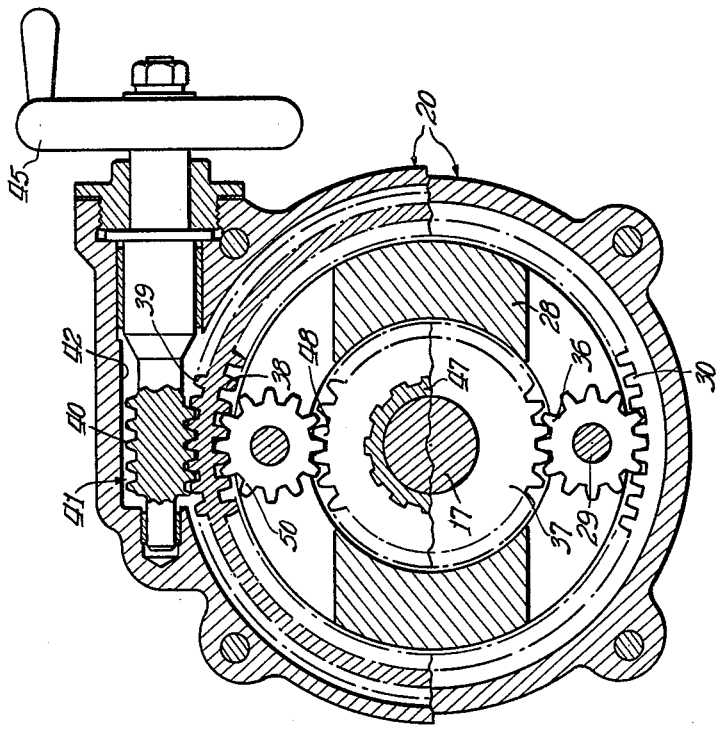
FIG. 4 is a sectional view taken along line 4—4 of FIG. 1 showing the arrangement of the gears used for rotating the sleeve on the drive shaft.

Referring to the drawings there is illustrated a variable speed transmission generally designated by the number 15 (FIG. 1) for transmitting power between a drive shaft 17 and a driven shaft 18. The driven shaft 18 is rotatably mounted in a bearing 19 in a casing 20 and the drive shaft 17 is rotatably mounted in the casing 20 and in the drive shaft 18 on bearings 26 and 27 respectively. A planet gear carrier 28 is rotatably mounted on the drive shaft 17 and has a shaft 29 extending therefrom which is parallel to the drive shaft 17. A ring gear 30 is rigidly mounted in casing 20 concentric with the drive shaft 17. A planetary gear 36 is rotatably mounted on the shaft 29 of the carrier 28 and is in mating engagement with the ring gear 30. A sun gear 37 is keyed to the drive shaft 17 and is in driving engagement with the planet gear 36.

A ring gear 38 is rotatably mounted in the casing 20 concentric with the drive shaft 17. The ring gear 38 has a set of teeth 39 on the outer periphery thereof which are in coacting engagement with threads 40 of a worm gear 41, which is held against longitudinal movement in an opening 42 of the casing 20. Rotation of the worm gear 41 will rotate the ring gear 38 about the drive shaft 17 in the casing 20. A hand wheel 45 is rigidly mounted to the worm gear 41 so that the worm gear 41 can be rotated by hand from outside the transmission casing 20. The hand wheel 45 may be replaced by an escapement responsive to a programming mechanism to automatically rotate the worm gear 41 in either direction to rapidly and automatically adjust the ring gear 38 which in turn will adjust the output torque and speed of the transmission as will be fully described subsequently.

A power transmitting sleeve 47 is rotatably mounted on the drive shaft 17 (FIG. 1). A sun gear 48 is splined to the sleeve 47 and is in driving engagement with a second planetary gear 50 which is rotatably mounted on the carrier shaft 29. The sleeve 47 has longitudinal gear teeth 49 formed in an outer surface thereof (FIG. 1).

A cam hub 56 is keyed to the drive shaft 17 and is thereby fixed to rotate with the drive shaft 17. The cam hub 56 has a pair of circular external cams 57 extending laterally therefrom. The cams 57 have outer reaction surfaces generally designated by the number 60. The outer cam surfaces 60 have two extremes 58 and 59, 180° apart, which are the highest and lowest points respectively of the cam surfaces 57. An eccentric 62 having an inner cylindrical surface 63 mounted on the cams 57 in sliding engagement with the outer surfaces 60 of the cams 57. It will be noted that the inner cylindrical surface 63 of the eccentric 62 is eccentrically positioned with respect to the axis of rotation of the drive shaft 17 because of the eccentricity of the cams 57.

The eccentric 62 has two external cylindrical surfaces 64 which are eccentric with the inner cylindrical surface 63 and which are thereby concentrically or eccentrically positionable with the drive shaft 17 (FIG. 1). It will be noted that the distance between the inner cylindrical surface 63 of the eccentric 62 and the upper outer eccentric surface of surface 64 (FIG. 1) is short and is less than the distance from the inner cylindrical surface 63 to the lower outer surface of surface 64 (FIG. 1). This difference is calculated to directly compensate for the eccentric characteristic of the cams 57 in the position shown and thereby position the outer surfaces 64 concentrically with the drive shaft 17 (FIG. 1). If the eccentric 62 is rotated 180° the short side of the eccentric 62 will be added to the low side 59 of the cams 57 and the long side of the eccentric 62 will be added to the high side 58 of the cams 57 thereby positioning eccentric 62 in an extreme eccentric position on shaft 17 (FIG. 5). If the eccentric 62 is rotated on the cams 57, to any position between that shown in FIG. 1 and that shown in FIG. 5, any magnitude of eccentricity between the minimum illustrated in FIG. 1 to a maximum illustrated in FIG. 5 may be provided.

A support sleeve 66 is rotatably mounted on the end portion of the drive shaft 17 (FIG. 1) and rotatably supports the drive shaft 17 in bearing 27 in the driven shaft 18. The sleeve 66 has longitudinal gear teeth 67 formed in the external surface thereof. A pair of thick ring gears 68 have gear teeth 69 in coacting engagement with a portion of respective gear teeth 49 and 67 of sleeves 47 and 66.

Figure 3:
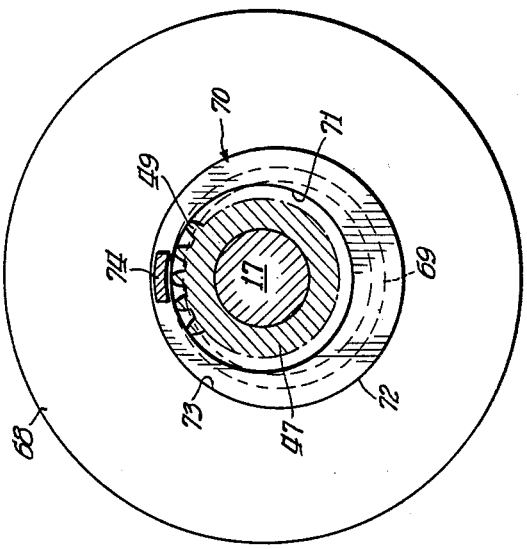
FIG. 3 is a section view taken along line 3—3 of FIG. 1 showing the limit linkage for the eccentric adjustment.

A pair of rings 70 having inner and outer non-concentric circular surfaces 71 and 72 respectively are slidably and rotatably mounted on respective teeth 49 and 67 of sleeves 47 and 66. The inner surfaces 71 of the rings 70 are in contact with the gear teeth 49 and 67 respectively and the outer surfaces 72 of the rings 70 are in engagement with an inner surface 73 of the respective ring gears 68. Each ring 70 has a projection 74 (FIGS. 1 and 3) which extends inwardly (FIG. 1) into the plane of rotation of respective webs 75 which extend longitudinally from the cams 57. The web 75 thereby limits the rotation of the ring 70 with respect to the cam 56.

A band 76 is rotatably mounted on the circular outer surfaces 60 of the eccentric 62 on bearings 77. The band 76 has two sets of saw teeth 78 and 79 on the outer surface 80 thereof in two annular formations thereon. The teeth 78 extend clockwise (FIG. 2) and teeth 79 extend counter clockwise (FIG. 2). Two sets of oppositely disposed springs designated by numerals 81 and 82 comprising individual rectangular springs 83 with arcuate cross-sectional areas are pivotably mounted on an inner surface 84 and 85 of reaction bands 86 and 87 respectively. The other ends of the springs 83 of spring sets 81 and 82 are in ratcheting engagement with the respective oppositely disposed saw teeth 78 and 79. Each set of springs 81 and 82 has an annular groove 88 formed therein in which a garter spring 89 is positioned which tends to hold the springs 83 extended (FIG. 1) to a limited position. The reaction band 86 is held stationary by a bolt 90 threaded through the casing 19 and extended into an aperture 91 of the reaction member 86. The reaction member 87 is connected to the driven shaft 18 by a flange 96.

After the eccentric 62, which is rotated by drive shaft 17, has been adjusted by the hand wheel as previously described to give a predetermined eccentricity with respect to the drive shaft 17, the individual springs 83 of spring sets 81 and 82 will be alternately subjected to a collapsing and extending force created by the band 63 moving eccentricaly in response to the action of the eccentric 62 and by the garter spring 89 respectively. Upon collapse of the springs 83 of spring sets 81 and 82, as a result of the action of the eccentric 62 the springs will cause the respective reaction members 86 and 87 to rotate clockwise and counter clockwise respectively, FIG. 5. Upon extension of the springs 83 of spring sets 81 and 82, with continued rotation of the eccentric 62, the springs 83 will extend as indicated in the upper portion of FIG. 5, and ratchet over the respective saw teeth 78 and 79 of the band 76 and thereby be in a position for a subsequent forced collapse of the springs as indicated in the lower portion of FIG. 5, and by a corresponding 180° rotation of the drive shaft 17 and the eccentric 62 to again create the reaction force previously described. This collapse and extension of the springs 83 and corresponding reaction and ratcheting resulting from the above described actions of the eccentric 62 resulting from the rotation of eccentric 62, band 63, springs 83, and reaction members 86 and 87 causes a reaction force to go from the stationary reaction member 86 to the spring set 81, to the band 76 through the spring set 82, to the reaction member 87 and thus to the driven shaft 18 through the flange 96.

*Operation*

In operation, to adjust the transmission to a desired output torque and speed, the hand wheel 45 (or any desired programming mechanism) is operated to rotate worm gear 41 which is operatively connected with ring gear 38 to rotate ring gear 38 relative to the stationary ring gear 30. This relative rotation of ring gear 38 will thus rotate planetary gears 50 relative to planetary gears 36 and likewise in response thereto the sun gear 48 will be rotated relative to the sun gear 37. The relative rotation of the sun gear 48 will cause the sleeve 47 and eccentric 62 to rotate relative to the drive shaft 17 and cam hub 56 keyed thereto. Thereupon the eccentric 62 will be positioned on the cams 57 to provide a predetermined eccentricity in the eccentric 62.

As the sleeve 47 is adjustably rotated on the drive shaft 17 to adjust the eccentric 62 on the cams 57, the left (FIG. 1) ring gear 68 is rotated by the sleeve 47, to the extent that the sleeve 47 is rotated, by the gear teeth 69 of the ring gear 68 which are in driving engagement with the teeth 49 of the sleeve 47. Similarly, the driving eccentric 62 will rotate the support sleeve 66 by virtue of the gear teeth 53 of the eccentric 62 which are in engagement with a portion of the gear teeth 67 of the support sleeve 66. The ring gear 68, adjacent the support sleeve 66 will be rotated by the rotation of the support sleeve 66 through the gear teeth 69 in engagement with the gear teeth 67 of the support sleeve. Both of the ring gears 68 will thus be rotated unitarily with the eccentric 62 about the shaft 17 in response to movement of the hand wheel 45.

The pair of rings 70 have eccentric surfaces 71 and 72 which occupy the space between ring gears 68 and the gear teeth 49 and 67 of the sleeves 47 and 66 respectively. As the ring gears 68 are rotated about the drive shaft 17, the projections 74 extending inwardly from the rings 70 will eventually contact the web 75, which extends longitudinally from the cams 57, so as to prevent further movement of the ring gears 68 and consequently further movement, in one direction, of all the adjusting linkages between the hand wheel 45 and the ring gear 68. The hand wheel can then be rotated in the opposite direction to move the eccentric 62 in the opposite direction. As previously described, the ring gear 68 will then force the extensions 74 of the rings 70 to rotate with the eccentric 62 until the extensions 74 rotate about drive shaft 17 to a point where they strike the opposite side of the web 75 and thereupon limiting motion in the opposite direction of all adjusting linkages.

While certain preferred embodiments of my invention have been specifically disclosed, it is understood that the invention is not limited thereto, as many variations will be readily apparent to those skilled in the art, and the invention is to be given its broadest possible interpretations within the terms of the following claims.

I claim:
1. A transmission comprising a casing, a driven shaft rotatably mounted in said casing, a drive shaft rotatably mounted in said driven shaft and said casing, a sleeve concentrically mounted on said drive shaft and rotatable with respect to said drive shaft, said sleeve having longitudinal gear teeth on the outer surface thereof, an eccentric rotatably mounted on said cam parallel to said drive shaft, said eccentric being geared to said sleeve to be rotated on said cam in response to rotation of said sleeve relative to said drive shaft, a first ring gear rigidly mounted in the casing concentric with said drive shaft, a second ring gear adjustably rotatably mounted in said casing concentric with said drive shaft, a planetary gear set drivingly interconnecting said ring gears and sun gear and sleeve, means for rotating said second ring gear for rotating said planetary gear set and said sleeve relative to said drive shaft while said drive shaft is rotating at a given speed to move said eccentric on said cam to rotatably adjust the eccentricity of said eccentric relative to the axis of rotation of said drive shaft, means to limit the rotation of said eccentric relative to said drive shaft to provide a maximum and minimum limit to the eccentricity of said eccentric, and means responsive to unitary rotation of said eccentric and said drive shaft for driving said driven shaft.

2. A transmission comprising a casing, a driven shaft rotatably mounted in said casing, a drive shaft rotatably mounted in said casing and said driven shaft, a first sun gear splined to said drive shaft, a first ring gear rigidly mounted in said casing concentric with said drive shaft, a planetary gear carrier, a first set of planetary gears rotatably mounted on said planetary gear carrier drivingly interconnecting said first ring gear and said first sun gear, a second ring gear rotatably adjustably mounted in said casing concentric with said drive shaft, a second sun gear rotatably mounted on said drive shaft concentric with said drive shaft, a second set of planetary gears rotatably mounted on said gear carrier drivingly interconnecting said second ring gear and said second sun gear, a cam rigidly mounted on said drive shaft, said cam having a circular peripheral cam surface eccentric with the axis of said drive shaft, an eccentric slidably mounted on the cam surface and rotatably about said cam, said eccentric having a ring gear in operative engagement with said second sun gear, means for rotating said second ring gear relative to said first ring gear about the axis of said drive shaft to rotate said eccentric relative to said drive shaft and said cam to adjust the eccentricity of said eccentric about said drive shaft, and means responsive to unitary rotation of said eccentric and said drive shaft by said drive shaft for driving said driven shaft.

3. A transmission comprising a casing, a driven shaft rotatably mounted in said casing, a drive shaft rotatably mounted in said driven shaft and said casing, a sleeve concentrically mounted on said drive shaft and rotatable with respect to said drive shaft, said sleeve having longitudinal gear teeth on the outer surface thereof, a laterally extending cam rigidly mounted to said drive shaft, an eccentric rotatably mounted on said cam parallel to said drive shaft, said eccentric being geared to said sleeve to be rotated on said cam in response to rotation of said sleeves relative to said drive shaft, a ring gear rigidly mounted in said casing concentric with said drive shaft and said driven shaft, a first sun gear splined to said drive shaft, a planetary gear carrier, a first set of planetary gears rotatably mounted on said planetary gear carrier drivingly interconnecting said first ring gear and said first sun gear, a second ring gear rotatably mounted in said casing concentric with said drive shaft, a second set of planetary gears rotatably mounted on said gear carrier drivingly interconnecting said second ring gear and said sleeve, means for rotating said second ring gear relative to said first ring gear about the axis of said drive shaft to rotate said eccentric relative to said drive shaft and said cam to adjust the eccentricity of the eccentric about the drive shaft, means to limit the rotation of said eccentric relative to said drive shaft, and means responsive to unitary rotation of said eccentric and said drive shaft for driving said driven shaft.

References Cited in the file of this patent
UNITED STATES PATENTS

| | | |
|---|---|---|
| 1,421,375 | Baines | July 4, 1922 |
| 2,014,954 | Sheridan | Sept. 17, 1935 |
| 2,116,624 | Garratt | May 10, 1938 |